(No Model.)
A. J. BOLSTER.
CULTIVATOR.
No. 489,844. Patented Jan. 10, 1893.
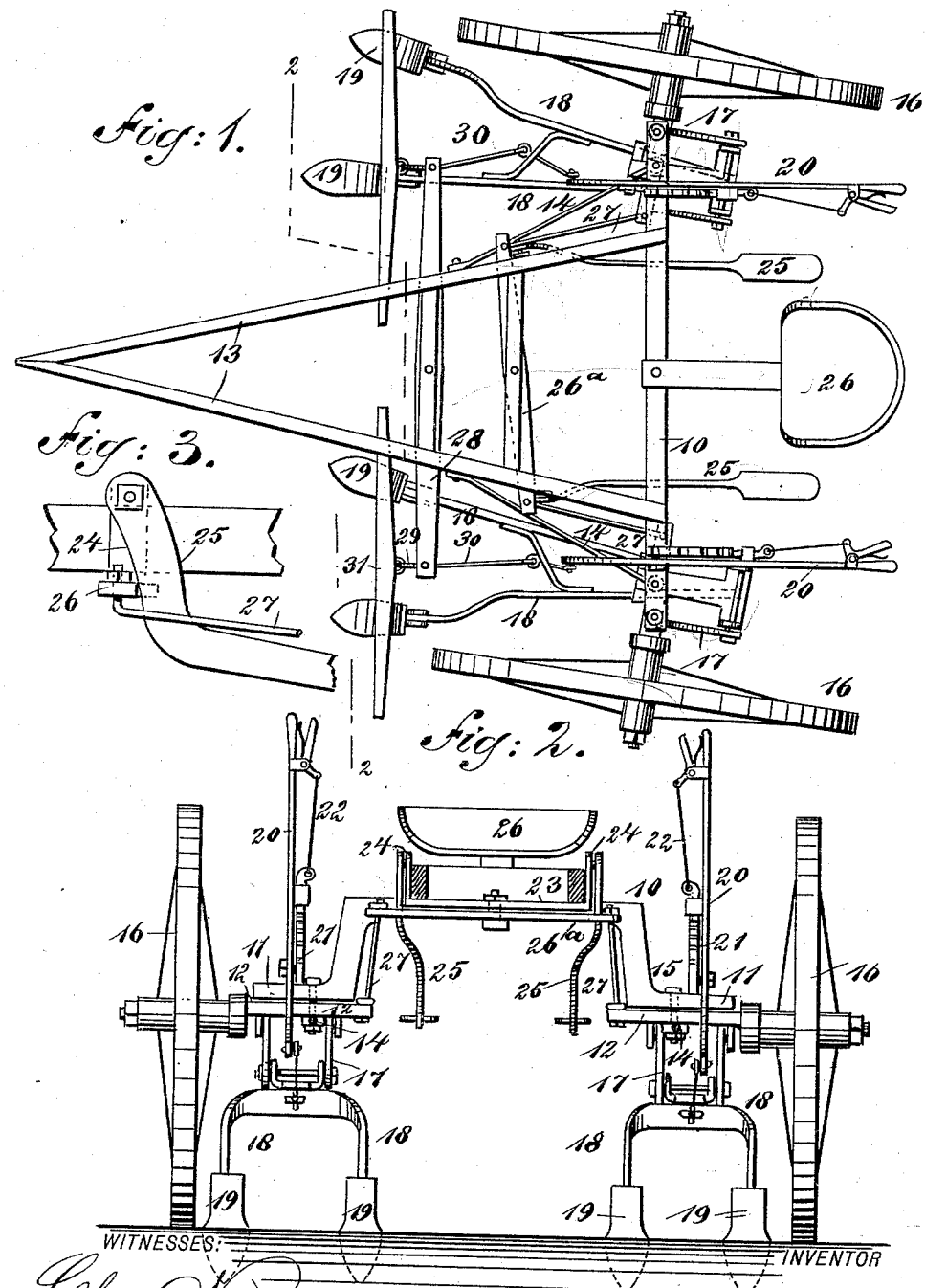
WITNESSES:
INVENTOR
BY
ATTORNEYS.

UNITED STATES PATENT OFFICE.

ALEXANDER J. BOLSTER, OF YORK, NEBRASKA.

CULTIVATOR.

SPECIFICATION forming part of Letters Patent No. 489,844, dated January 10, 1893.

Application filed September 13, 1892. Serial No. 445,822. (No model.)

*To all whom it may concern:*

Be it known that I, ALEXANDER J. BOLSTER, of York, in the county of York and State of Nebraska, have invented a new and useful Improvement in Cultivators, of which the following is a full, clear, and exact description.

My invention relates to an improvement in cultivators, and has for its object to provide an arch cultivator in which the gangs will be located forward of the arch so that their operation may be readily viewed by the rider.

Another object of the invention is to provide for a convenient and expeditious elevation of the cultivators, and to locate the cultivators near the wheels of the machine.

It is a further object of the invention to so locate the axles upon the arch and the cultivator gangs upon the axles that they will move together, and also to provide a means whereby at the option of the rider the wheels may be turned to the right or to the left so as to reduce the width of the machine, the gangs sustaining the same relation to the wheels at all times.

It is another object of the invention to lessen the draft as the gangs are brought close to the forward portion of the wheels as well as close to the team.

The invention consists in the novel construction and combination of the several parts, as will be hereinafter fully set forth and pointed out in the claims.

Reference is to be had to the accompanying drawings forming a part of this specification, in which similar figures of reference indicate corresponding parts in all the views.

Figure 1 is a plan view of the machine; and Fig. 2 is a vertical section taken practically on the line 2—2 of Fig. 1. Fig. 3 is a detail view illustrating the manner in which the evener and post levers co-operate.

In carrying out the invention the arch 10 of the machine is provided at the extremities of its members with horizontal arms 11, and to each of these arms a spud axle 12, is pivotally attached in any suitable or approved manner. The inner ends of the spud axles have guided movement upon the arch, as the inner extremities of the axles are provided with sockets receiving lips or studs projected from the arch, but the movement of the axles upon the arms of the arch is free. Upon the top of the arch the pole 13, is securely attached, and this pole is somewhat V-shaped, the contracted end being at the front, and the attachment of the pole to the arch is made at its expanded end. A brace 14, is secured to each side of the pole, and these braces at their opposite ends are attached to a pivot pin 15, by means of which the axles are pivoted to the arch and each axle has loosely mounted thereon a supporting wheel 16. Each axle has attached to it a downwardly-extending yoke 17, the yoke not only extending downward but also in a rearward direction, as is best indicated in Fig. 1; and upon each of these yokes one or more shanks, preferably two, are pivotally attached, the shanks being designated as 18. The shanks curve downward at their forward ends in direction of the ground, and each is provided with a cultivator blade 19 attached to it. These shanks and blades I designate as gangs, and it will be observed that the blades are located well forward of the arch, within convenient view of the rider of the implement, and that the gangs are located adjacent to the supporting wheels.

The shanks of the cultivator are raised and lowered through the medium of levers 20, which levers are fulcrumed preferably upon racks 21 secured upon the arms of the arch, and each lever is provided with a thumb latch 22, to engage with the toothed surfaces of the racks.

Upon the under face of the pole 13, in front of the arch, a bar 23, is securely fastened, and the ends of this bar are carried upward outside of the pole to form standards 24. Upon each standard 24, the upper end of a foot lever 25, is fulcrumed, as shown in Fig. 3. These levers extend downward and rearward from their pivotal points, and are then carried rearward beneath the arch in somewhat of a horizontal direction, and are within convenient reach of the driver's feet when the driver is upon the seat 26, the support of which seat is secured upon the arch and extends rearwardly from it.

Beneath the bar 23 an evener 26ª, is centrally fulcrumed, and the ends of this evener are attached, through the medium of links 27, each end with the extremity of one of the spud axles, so that the spud axles may be turned by pressing the levers downward either to the right or to the left, carrying the supporting wheels and the gangs with them and maintaining the same distance at all times between the gangs and the said supporting wheels, as when one of the foot levers is pressed downward its upper substantially vertical portion will engage with one outer end of the evener 26ª and force that end in a forwardly direction. A second evener 28, is fulcrumed upon the under face of the pole in advance of the evener 26ª, and from the extremities of the forward evener 28 draft bars 29, are projected vertically downward, the draft bars being pivotally attached to the evener, and the said bars are provided with a series of apertures to receive the forward ends of rods or links 30, which rods or links at their rear ends are attached to the gangs, as shown in Fig. 1, so that the draft is directly upon the gangs and downward, tending to force the blades into the ground. Each draft bar 29, has attached to its outer end a singletree 31. It will be seen that when downward pressure is exerted upon one of the foot levers, the inside end of the axle with which that lever has communication will be, for example, forced inward, the axle being on the right-hand side of the cultivator, while the axle on the left-hand side will be forced rearward. In this manner the machine will be directed in direction of the right, and by pressing down upon the opposite foot lever the machine will be guided toward the left.

The arrangement of the machine enables the operator to run the gangs considerably forward of the coupling, thereby bringing the draft very close to the team; and by throwing the wheels and the gangs either to the right or to the left the cultivator is rendered narrower than ordinary between the wheels, which prevents the rolling down of corn in the side rows if the rows are close together. The same distance is always maintained between the gangs and the wheels. The construction of the machine also overcomes the difficulty ordinarily experienced in trashy ground, as the wheels will run alongside and close to the gangs, and therefore any trash that may be accumulated by the gangs will be withdrawn by the action of the wheels.

Having thus described my invention, I claim as new, and desire to secure by Letters Patent,—

1. In a cultivator, the combination, with an arch, an evener connected with the arch, and foot levers acting upon the evener, of spud axles pivotally connected with the arch, gangs carried by the spud axles, and a connection between the axles and the evener, substantially as shown and described.

2. In a cultivator, the combination, with an arch and a shifting device carried by the arch, of spud axles pivotally connected with the members of the arch at their lower ends, gangs located forward of the arch and connected with the axles, and a connecting medium between the axles and the shifting device connected with the arch, as and for the purpose set forth.

3. In a cultivator, the combination, with an arch, a pole projected from the arch, an evener pivoted beneath the pole, and foot levers fulcrumed upon the pole and adapted for engagement with the ends of the evener, of spud axles pivotally connected with the lower ends of the arch, yokes projected downwardly and rearwardly from the axles, cultivator shanks pivotally connected with the yokes, extending forwardly therefrom and adapted to receive blades at their lower ends, link connections between the axles and the evener, and a lifting mechanism connected with the cultivator shanks, as and for the purpose set forth.

4. In a cultivator, the combination, with an arch having horizontal arms projected from its ends, a pole connected with the arch, an evener pivoted upon the pole, and foot levers fulcrumed upon the pole, engaging with the evener and extending rearwardly therefrom, of spud axles pivoted upon the arms of the arch, yokes projected downwardly and rearwardly from the axles, cultivator shanks pivotally connected with the yokes, the shanks being adjacent to supporting wheels carried by the axles, cultivator blades carried by the lower ends of the shanks, a lifting mechanism connected with the cultivator shanks, and a link connection between the ends of the evener and the inner ends of the axles, substantially as shown and described.

ALEXANDER J. BOLSTER.

Witnesses:
CHARLES BYERS,
GUSTAV F. WRUCK.